(12) United States Patent
Park et al.

(10) Patent No.: US 12,487,272 B2
(45) Date of Patent: Dec. 2, 2025

(54) COMPUTING DEVICES FOR PREDICTING ELECTRICAL TESTS, ELECTRICAL TEST PREDICTION APPARATUSES HAVING THE SAME, AND OPERATING METHODS THEREOF

(71) Applicant: Samsung Electronics Co., Ltd., Suwon-si (KR)

(72) Inventors: Seyoung Park, Hwaseong-si (KR); Gwangnae Gil, Yongin-si (KR); Sola Woo, Suwon-si (KR); Jonghyun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 17/825,087

(22) Filed: May 26, 2022

(65) Prior Publication Data
US 2023/0108149 A1  Apr. 6, 2023

(30) Foreign Application Priority Data

Oct. 6, 2021  (KR) .................. 10-2021-0132564

(51) Int. Cl.
*G01R 31/26* (2020.01)
*G06N 20/00* (2019.01)
*G01R 31/28* (2006.01)
*G01R 31/3183* (2006.01)

(52) U.S. Cl.
CPC ......... *G01R 31/2601* (2013.01); *G06N 20/00* (2019.01); *G01R 31/28* (2013.01); *G01R 31/2832* (2013.01); *G01R 31/318357* (2013.01)

(58) Field of Classification Search
USPC ........................................... 702/58
See application file for complete search history.

(56) References Cited

U.S. PATENT DOCUMENTS

| | | | |
|---|---|---|---|
| 6,941,531 B1 | 9/2005 | Teig et al. | |
| 6,961,914 B1 | 11/2005 | Teig et al. | |
| 7,051,293 B1 | 5/2006 | Teig et al. | |
| 10,372,859 B2 | 8/2019 | Nagaraja | |
| 2004/0040001 A1 | 2/2004 | Miller et al. | |
| 2008/0172189 A1* | 7/2008 | Kadosh | H01L 22/10 702/58 |
| 2010/0109150 A1* | 5/2010 | Caruana | H01L 21/4853 438/106 |

(Continued)

FOREIGN PATENT DOCUMENTS

JP   2005536887 A   12/2005
JP   3972076 B2   6/2007

(Continued)

*Primary Examiner* — Paul D Lee
(74) *Attorney, Agent, or Firm* — Wolf, Greenfield & Sacks, P.C.

(57) ABSTRACT

A method of operating an electrical test prediction apparatus includes determining a relationship between first electrical test (ET) data, corresponding to at least one shot region comprising a subset of a plurality of semiconductor chips of a wafer, and electrical die sorting (EDS) data, obtained by measuring a state of each chip on the wafer by a testing device, and predicting second ET data, corresponding to an region of the wafer other than the at least one shot region by performing machine learning on the relationship.

19 Claims, 6 Drawing Sheets

(56) References Cited

U.S. PATENT DOCUMENTS

| | | |
|---|---|---|
| 2017/0103154 A1 | 4/2017 | Jeon et al. |
| 2020/0364389 A1 | 11/2020 | Ho et al. |
| 2021/0325788 A1 | 10/2021 | Ypma et al. |
| 2023/0053696 A1 | 2/2023 | Lee et al. |
| 2023/0056869 A1 | 2/2023 | Gil et al. |
| 2023/0111796 A1* | 4/2023 | Kannampalli ...... G06F 11/2263 714/26 |
| 2023/0142936 A1* | 5/2023 | Sendoda ................ G06N 20/20 382/100 |

FOREIGN PATENT DOCUMENTS

| | | |
|---|---|---|
| JP | 5370370 B2 | 9/2013 |
| JP | 2020184123 A | 11/2020 |
| JP | 2021502694 A | 1/2021 |
| KR | 20170043371 A | 4/2017 |
| KR | 102225817 B1 | 3/2021 |
| KR | 102230354 B1 | 3/2021 |
| KR | 20210110896 A | 9/2021 |
| KR | 20230027585 A | 2/2023 |
| KR | 20230027588 A | 2/2023 |
| WO | 2018202361 A1 | 11/2018 |
| WO | 2021101069 A1 | 5/2021 |

* cited by examiner

COMPUTING DEVICES FOR PREDICTING ELECTRICAL TESTS, ELECTRICAL TEST PREDICTION APPARATUSES HAVING THE SAME, AND OPERATING METHODS THEREOF

CROSS-REFERENCE TO RELATED APPLICATION(S)

This application claims benefit of priority to Korean Patent Application No. 10-2021-0132564, filed on Oct. 6, 2021, in the Korean Intellectual Property Office, the entire contents of which are incorporated by reference herein.

TECHNICAL FIELD

The present disclosure relates to computing devices for predicting electrical tests, electrical test prediction apparatuses that include the computing devices, and to methods of operating the electrical test prediction apparatuses and the computing devices.

BACKGROUND

In general, electrical die sorting (EDS) is a process in which various tests are performed in a wafer state to check states of respective chips. Such a process may allow manufacturing process and design issues to be corrected, and may allow yield to be increased through feedback during process and design phases. An electrical test (ET) is a process in which parameters of electrical DC voltage and current characteristics are tested on individual devices (for example, transistors, resistors, capacitors, diodes, and the like), that are used in the operation of a semiconductor chip, and thereby determine whether the individual devices are operable.

SUMMARY

Aspects of the present disclosure and examples of embodiments thereof provide computing devices for predicting electrical tests, electrical test prediction apparatuses including the computing devices, and methods of operating the electrical test prediction apparatuses and computing devices.

According to some example embodiments, a method of operating an electrical test prediction apparatus may include: determining a relationship between first electrical test (ET) data corresponding to at least one shot region comprising a subset of a plurality of semiconductor chips on a wafer, and electrical die sorting (EDS) data obtained by a testing device by measuring a state of each of the plurality of semiconductor chips on the wafer; and predicting by second ET data, corresponding to an unmeasured region of the wafer other than the at least one shot region by performing machine learning on the relationship. Each of the first ET data and the second ET data may include at least one electrical parameter association with operation of the semiconductor chips of the wafer.

According to some example embodiments, an electrical test prediction apparatus may include: a testing device configured to perform an electrical test on each of a plurality of shot regions of a wafer, each of the plurality of shot regions including at least one semiconductor chip; and a computing device that may be configured to determine a relationship between first shot data measured from the testing device, and electrical die sorting (EDS), obtained by measuring a state of each of the semiconductor chip on the wafer. The computing device may be configured to perform machine learning on the relationship, and may be configured to predict second shot data for semiconductor chips of a region of the wafer other than the plurality of shot regions using result values obtained by performing the machine learning. The first shot data and the second shot data may include at least one electrical parameter of an individual device associated with operation of a semiconductor chip.

According to some example embodiments, a computing device may include: a processor configured to drive an electrical test (ET) prediction tool; and a memory configured to store electrical die sorting (EDS) data obtained from the ET prediction tool and a state of each semiconductor chip on a wafer. The ET prediction tool may be configured to sample ET measured from the wafer using a testing device, may be configured to match the sampled ET data with the same EDS coordinates, may be configured to perform machine learning on the matching ET data and the EDS data, and may be configured to predict overall ET data based on a result obtained by performing the machine learning. The ET data may include at least one electrical parameter of an individual device used in operation of a semiconductor chip.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, some example embodiments will be described with reference to the accompanying drawings.

In electrical test (ET) prediction apparatuses according to some example embodiments and in methods of operating the same, a relationship between electrical die sorting (EDS) data, obtained by measuring all chips on a wafer, and a Direct Current (DC) device may be determined, and electrical test characteristics of semiconductor chips within an area of a wafer (e.g., a full shot) may be predicted with sampled or partial shot data using machine learning.

Figure 1:
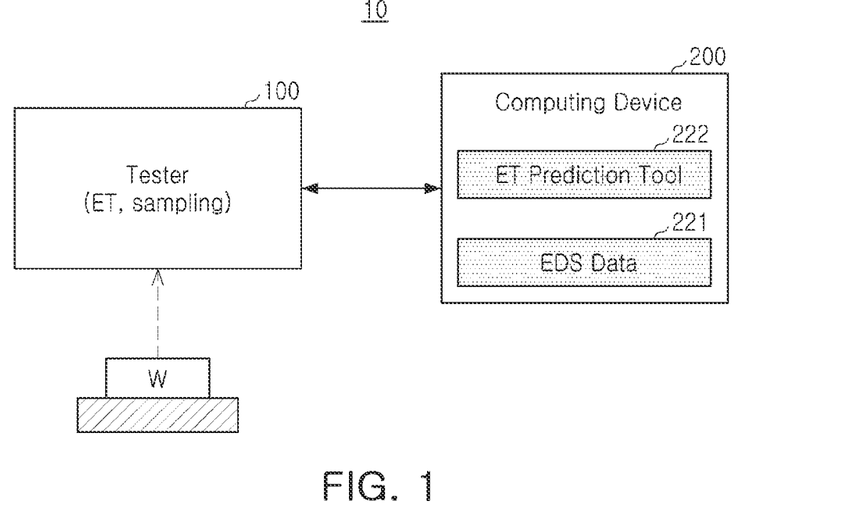
FIG. 1 is a schematic view illustrating an electrical test (ET) prediction apparatus according to some example embodiments.

FIG. 1 is a schematic view illustrating ET prediction apparatus 10 according to some example embodiments. Referring to FIG. 1, the ET prediction apparatus 10 may include a testing device 100 and a computing device 200.

The testing device 100 may be configured to perform an ET on the wafer W. The wafer W may include a plurality of semiconductor chips.

The testing device 100 may include a probe card (not shown) for performing the ET. The testing device 100 may perform a test in units of shots according to the probe card. A shot or a shot region may be a test area, in which a plurality of chips therein may be simultaneously tested, of the wafer W. In some embodiments, a shot region may vary according to the type of probe card.

In some embodiments, the testing device 100 may perform an ET in respective predetermined positions in units of shots. In some embodiments, the number of the predetermined positions may be nine. However, it will be understood that the present disclosure and the number of the predetermined positions is not limited thereto.

In some embodiments, the testing device 100 may perform an ET on a test element group (TEG) between chips of a shot region. An electric die sorting (EDS) process is a process in which, before packaging semiconductor chips, defective chips may be removed to prevent time and costs required to package the defective semiconductor chips. The EDS process may include an ET process for measuring a TEG formed in a scribe line region and a process for determining a defect of a semiconductor chip formed on a semiconductor substrate. In greater detail, the TEG may be within the scribe line to measure characteristics of electric devices used for a semiconductor chip, for example, pure electric devices such as transistors, resistors, capacitors, diodes, and/or the like. Since the TEG may be fabricated by a fabrication process under the same conditions, environment, and apparatus as the semiconductor chip formed on the semiconductor substrate, the TEG may be measured to detect characteristics of electric devices of semiconductor chips formed on a semiconductor substrate to be tested. For example, the ET may measure the TEG to calculate electrical characteristic data, such as DC voltage and current characteristics, for electrical devices that are used in operation of the semiconductor chip, and thus may monitor a manufacturing process. Since the TEG is on or within the scribe line in a shot region, criteria of a photolithography process, a single TEG may be provided per plurality of chips.

The computing device 200 may be configured to predict ET values of all chips of the wafer W using an ET measurement result of the testing device 100 and the EDS data 221. The chips for which predicted ET values are determined may be in regions of the wafer W that are not in the predetermined positions (e.g., the nine shot regions discussed above). The computing device 200 may drive an ET prediction tool 222. The ET prediction tool 222 may perform machine learning using the ET measurement result and the EDS data 221 to predict the ET values of all chips. The EDS data 221 may be data generated in an EDS process.

In general, an EDS process may include ET and wafer burn-in (WBI) testing, hot/cold testing, repair/final testing, and/or inking processes. As discussed above, an ET may be a process of testing parameters of electrical DC voltage and current characteristics of individual devices (e.g., transistors, resistors, capacitors, diodes, and the like), used in operation of a semiconductor integrated circuit, and a determination is made as to whether the individual devices are operable. In a wafer burn-in (WBI) test process, a predetermined temperature may be applied to a wafer, and then an alternating current (AC) voltage and a DC voltage may be applied thereto to detect potential defects such as product defects, vulnerable portions, and/or the like. A hot/cold test may be performed to determine whether there is a defective chip, among chips on the wafer, through electrical signals. Information may be stored to process a repairable chip in a repair process. For example, the hot/cold test may include tests performed (e.g., sequentially, in parallel) at temperatures higher and lower than room temperature to determine whether a chip operates normally at a specific temperature. The repair test may be performed to repair chips that are determined to be repairable in the hot/cold test, and to re-verify whether repaired chips are good or defective through a final test. The inking process may be performed such that data is processed to distinguishably identify defective chips. Such defective chips are not subjected to a packaging operation. A wafer, on which the inking process has been performed, may be baked, subjected to a quality control (QC) test, and then transferred to a packaging process.

In general, various tests are performed in a semiconductor manufacturing process. An ET is a test for measuring and managing electrical characteristics. A main purpose of the ET is to manage a central value/distribution. For this reason, the ET may measure/manage a specific number of shots per wafer. To confirm all characteristics in a specific zone or a wafer, it may be necessary to select a sample chip and to additionally measure the ET. However, such measurement may have a limitation in representing products. Due to characteristics of a semiconductor industry having a large amount of turnaround time (TAT, total time required to produce a product), previous quantity of data may be required, but existing measurement methods may be limited.

The ET prediction apparatus 10 according to some example embodiments may predict ET characteristics of an unmeasured shot using the EDS data obtained by measuring all chips. Also, the ET prediction apparatus 10 according to some example embodiments may perform accurate ET prediction with mass data using a machine learning technique.

Figure 2:
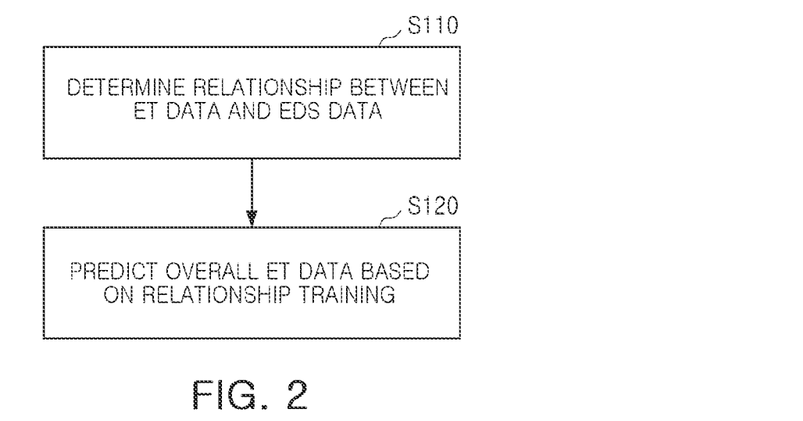
FIG. 2 is a flowchart illustrating the ET prediction apparatus according to some example embodiments.

FIG. 2 is a flowchart illustrating the ET prediction apparatus 10 according to some example embodiments. Referring to FIGS. 1 and 2, the ET prediction apparatus 10 may operate, as follows.

In operation S110, the ET prediction apparatus 10 may determine a relationship between the ET data and the EDS data. The ET data may include shot data measured for each of a plurality of predetermined shot regions measured from the testing device 100. In some embodiments, the number of the plurality of shot regions may be nine.

The ET prediction apparatus 10 may compare ET result values (shot data) on actual data with the EDS data. Machine learning may be performed on the relationship between the actually measured ET result values (shot data) and the EDS data. The machine learning may be performed based on at least one of various algorithms such as a neural network, support vector machine (SVM), linear regression, a decision tree, a generalized linear model (GLM), random forest, gradient boosting machine (GBM), deep learning, clustering, anomaly detection, dimension reduction, and the like. In some embodiments, such machine learning may consider a weight according to coordinates and a gradient. In operation S120, full shot data may be predicted using a relationship between pieces of trained data.

In some embodiments, the ET data may include power supply delay time, and the EDS data may include a loading capacitance value corresponding to the power supply delay time, a turn-on-current value of a transistor, and/or a resistance value, as examples. In some embodiments, EDS coordinates may match corresponding ET data. In some embodiments, machine learning may be performed on the relationship between the ET data and the EDS data in consideration of the weight, according to the matching coordinates or a gradient. In some embodiments, ET data may be predicted using the relationship on which the machine learning has been performed. In some embodiments, the measured ET data and the predicted ET data may be analyzed to model a cause of a process issue. In some embodiments, a process may be improved according to a modeled cause of a process issue.

In the ET prediction method according to some example embodiments, ET data for an unmeasured shot may be predicted from mass data through training using the ET-EDS relationship measured during ET-EDS linkage analysis. The ET prediction may be performed by more precisely setting the relationship in mass data through machine learning.

Figure 3:
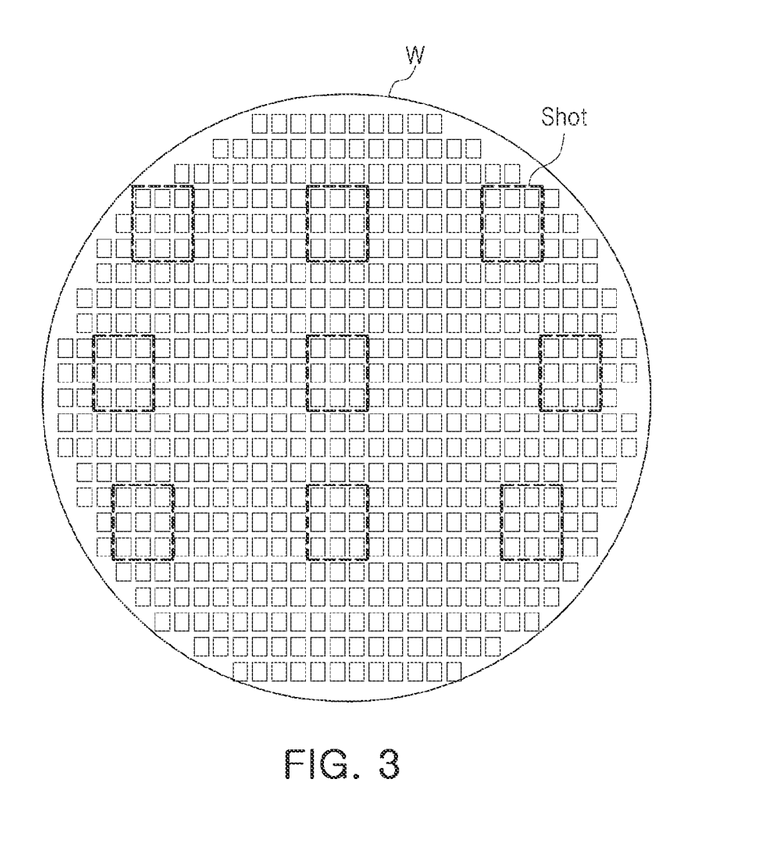
FIG. 3 is a schematic view illustrating shot regions measured by the ET prediction apparatus according to some example embodiments.

FIG. 3 is a schematic view illustrating shot regions measured by the ET prediction apparatus 10 according to some example embodiments. Referring to FIG. 3, ET measurement may be performed on a predetermined number of shot regions on a wafer W. In FIG. 3, a shot region including nine shot regions and a shot region including nine chips are illustrated for ease of description, but it will be understood that the present disclosure, the number of shot regions, and/or the sizes of the shot regions are not limited thereto.

Figure 4:
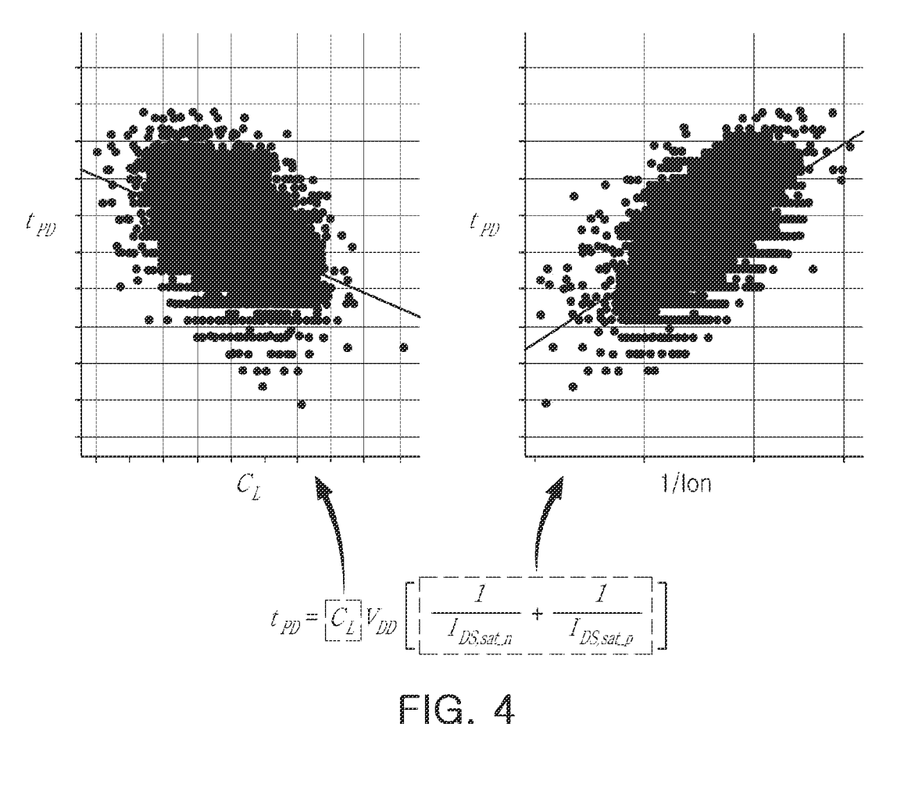
FIG. 4 is a schematic view illustrating an operation of determining a relationship between ET data and electrical die sorting (EDS) data according to some example embodiments.

FIG. 4 is a schematic view illustrating an operation of determining a relationship between ET data and EDS data according to some example embodiments.

Referring to FIG. 4, a relationship between a loading capacitance $C_L$ and a power supply delay time $t_{PD}$, and a relationship between turn-on current Ion and the power supply delay time $t_{PD}$ are illustrated. The power supply delay time $t_{PD}$ may be ET data, and the loading capacitance $C_L$ and the turn-on current Ion may be sampled shot data. As illustrated in FIG. 4, the power supply delay time $t_{PD}$ may be in proportion to the loading capacitance $C_L$ 1/Ion of an NMOS/PMOS transistor, or resistance.

Figure 5:
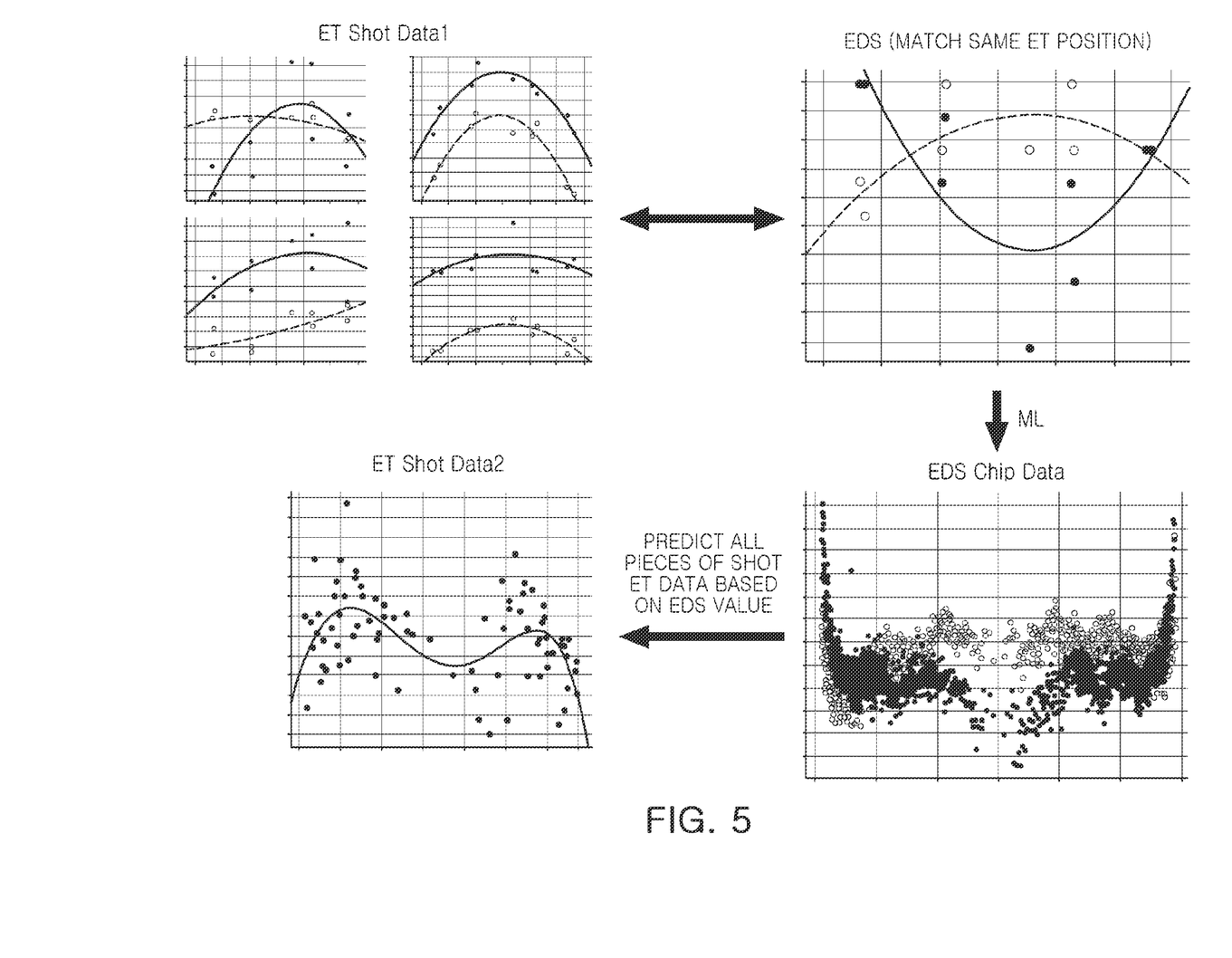
FIG. 5 is a schematic view illustrating an operation of predicting ET data according to some example embodiments.

FIG. 5 is a schematic view illustrating an operation of predicting ET data according to some example embodiments. Referring to FIG. 5, a relationship between the ET data and EDS data may be determined by matching the EDS data with the same ET position. Such a relationship may be trained through machine learning ML. All pieces of shot data may be predicted using the trained relationship. As illustrated in FIG. 5, first shot data may be measured and second shot data may be predicted. The second shot data may be predicted using the measured first shot data.

Figure 6:
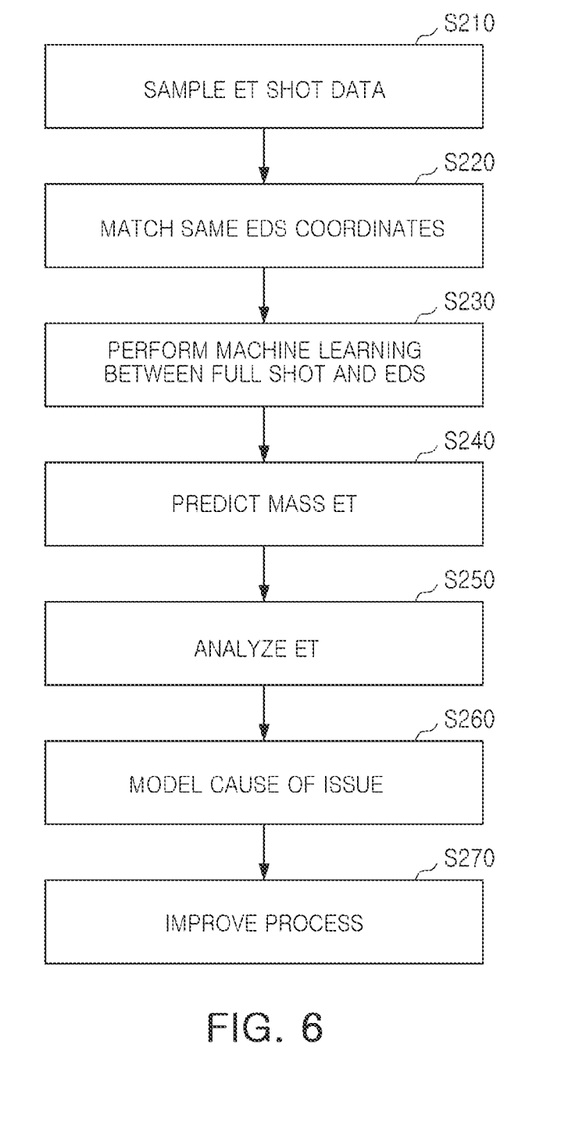
FIG. 6 is a flowchart illustrating a process improvement method using the ET prediction apparatus according to some example embodiments.

FIG. 6 is a flowchart illustrating a method of improving a process using an ET prediction apparatus 10 according to some example embodiments. Referring to FIGS. 1 to 6, the ET prediction apparatus 10 may operate, as follows.

In operation S210, the ET prediction apparatus 10 may sample shot data measured from the testing device 100. In operation S220, the computing device 200 of the ET prediction apparatus 10 may match coordinates of the sampled shot data with EDS data. In operation S230, the ET prediction tool 222 of the computing device 200 may input or receive the matching shot data and EDS data and perform machine learning between the full shot data and the EDS data. In operation S240, as a result of performing the machine learning, all chips, for example, mass ET data may be predicted. In operation S250, the computing device 200 may analyze the predicted ET data. In operation S260, as a result of the analysis, the computing device 200 may model a cause of a process issue. In operation S270, the computing device 200 may improve a process based on the modeling. Such modeling may be applied to processing and fabrication of a fin field effect transistor (FinFET) structure, although the present disclosure is not limited thereto. Inputs to such modeling may be etching process parameters, flowable chemical vapor deposition (CVD) process parameters, chemical mechanical polishing (CMP) process parameters, oxide metrology outputs, TEM's, yield results, and the like. Such modeling may be used to detect and address issues with an etching process, a flowable CVD process, and/or a CMP process, as examples.

In a process improvement method using the ET prediction apparatus 10 according to some example embodiments, machine learning may be performed between the sampled or partial shot data and the EDS data to predict full-shot data, and the predicted full-shot data may be used to improve a process.

On the other hand, a process improvement method may be used after the full-shot data is acquired through the machine learning.

Figure 7:
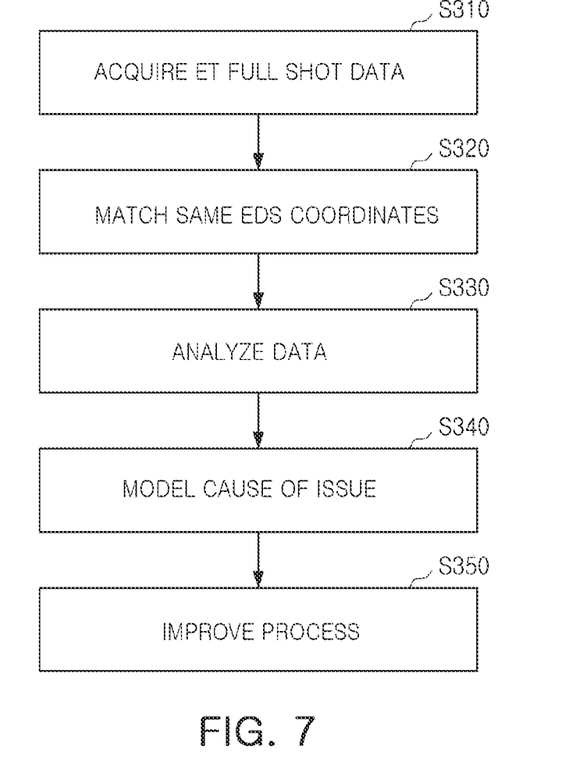
FIG. 7 is a flowchart illustrating a process improvement method using the ET prediction apparatus according to some example embodiments.

FIG. 7 is a flowchart illustrating a method of improving a process using the ET prediction apparatus 10 according to some example embodiments. Referring to FIGS. 1 to 7, the process improvement method may include the following operations.

In operation S310, the ET prediction apparatus 10 may acquire all pieces of shot data using the sampled shot data and machine learning ML, as illustrated in FIG. 6. In operation S320, matching with the same EDS coordinates as the shot data may be performed. In operation S330, data may be analyzed based on a result of the matching. In operation S340, a cause of an issue may be modeled according to data analysis. In operation S350, a process may be improved using the modeling.

Figure 8:
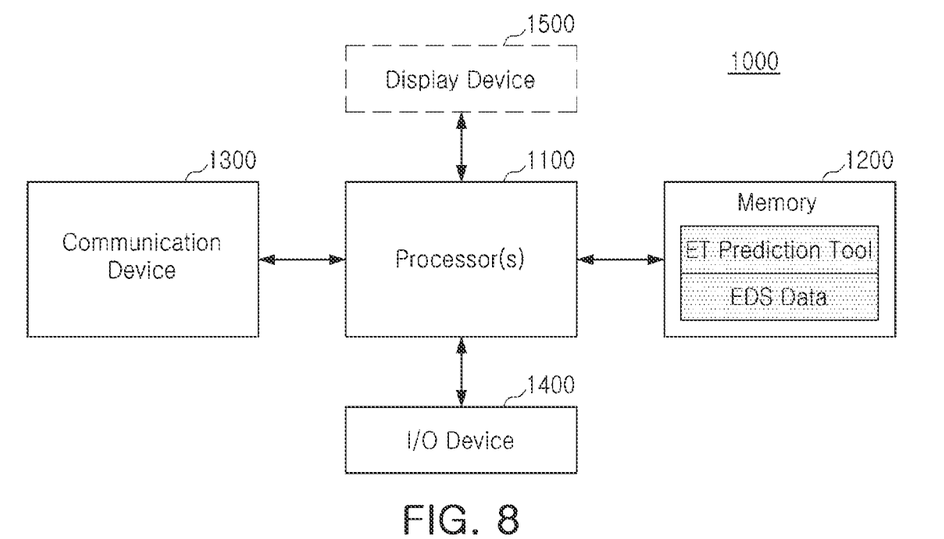
FIG. 8 is a schematic view illustrating a computing device according to some example embodiments.

FIG. 8 is a schematic view illustrating a computing device 1000 according to some example embodiments. Referring to FIG. 8, the computing device 1000 may include at least one processor 1100, a memory 1200, a communications device 1300, an input/output device 1400, and a display device 1500.

The processor 1100 may be configured to execute at least one instruction (or program) for performing one or more ET prediction methods, including those described with reference to FIGS. 1 to 7. The processor 1100 may execute an instruction, and may control the computing device 1000.

In some embodiments, the at least one instruction may be executed by at least one processor 1100 such that a relationship is determined using actually measured ET data and EDS data and machine learning is performed using the relationship and the actually measured ET data to predict full-shot data.

The computing device 1000 may be connected to an external device (for example, a personal computer or a network) through the input/output device 1400, and may exchange data.

The memory 1200 may be configured to store at least one instruction. The processor 1100 may perform the above-mentioned operations when the at least one instruction stored in the memory 1200 is executed by the at least one processor 1100. In some embodiments, the memory 1200 may store mass ET data and a transistor modeling tool.

The memory 1200 may include a volatile memory and/or a nonvolatile memory. The memory 1200 may include a storage device to store user data. The storage device may be an embedded multimedia card (eMMC), a solid state drive (SSD), a universal flash storage (UFS), or the like. The storage device may include at least one nonvolatile memory device. The nonvolatile memory device may be a NAND flash memory, a vertical NAND flash memory (VNAND), a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like.

The communications device 1300 may be configured to communicate with an external network through various wired/wireless methods. For example, the communications device 1300 may perform wireless fidelity (Wi-Fi), Wi-Fi Direct, Bluetooth, ultra wide band (UWB), or near field communication (NFC), universal serial bus (USB), or network communication such as high definition multimedia interface (HDMI), local area network (LAN), or the like.

The display device 1400 may be implemented as various types of display, such as a liquid crystal display (LCD), an organic light emitting diode (OLED) display, an active-matrix organic light-emitting diode (AM-OLED), a plasma display panel (PDP), or the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS. Also, the processing device may access, store, manipulate, process and create data in response to execution of the software. For ease of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

Methods according to some embodiments may be implemented as program instructions executable by various computer devices, and may be recorded in computer-readable storage media. The computer-readable storage media may individually or collectively include program instructions, data files, data structures, and the like. The program instructions recorded in the media may be implemented using proprietary tools and/or languages specially designed and configured for various different embodiments, and/or may be implemented using tools and/or languages readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, or the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of various different embodiments, and vice-versa.

In an ET prediction apparatus according to some example embodiments and methods of operating the same, a relationship between EDS data, obtained by measuring all chips, and a DC device may be trained by machine learning to predict an ET value of an unmeasured shot such that an issue, in which ET characteristics of a full shot is not considered with several pieces of shot data, may be addressed.

In an ET prediction apparatus according to some example embodiments and methods of operating the same, a central value or distribution in a wafer may be managed. In addition, when it is difficult to analyze defects of a specific region and to determine characteristics of all chips in a wafer, a cause of defects and a characteristic-vulnerable region may be determined more easily during prediction of chip characteristics of an unmeasured region.

In an ET prediction apparatus according to some example embodiments and methods of operating the same, training using machine learning may be added based on a relationship between an EDS measurement value, obtained by measuring all chips, and an ET to predict unmeasured data.

An ET prediction method according to some example embodiments may be used to predict or improve yield for quality or usefulness of a product.

As described above, according to a computing device for predicting an electrical test, an electrical test prediction apparatus including the computing device, and a method of operating the electrical test prediction apparatus described above, machine learning may be performed on a relationship between several pieces of actually measured ET data and EDS data to predict ET data for a full shot.

While some example embodiments have been shown and described above, it will be apparent to those skilled in the art that modifications and variations could be made without departing from the scope of the present inventive concepts as defined by the appended claims.

What is claimed is:

1. A method comprising:
   determining a relationship between first electrical test (ET) data corresponding to at least one shot region comprising a subset of a plurality of semiconductor chips on a wafer, and electrical die sorting (EDS) data obtained, by a testing device, by measuring a state of each of the plurality of semiconductor chips on the wafer; and
   predicting second ET data corresponding to an unmeasured region of the wafer other than the at least one shot region, by performing machine learning on the relationship; and
   modifying one or more of an etching process, a flowable CVD process, and a CMP process for at least one of the plurality of semiconductor chips based on the first ET data, the EDS data, and the second ET data, wherein:

each of the first ET data and the second ET data includes at least one electrical parameter associated with operation of semiconductor chips of the wafer.

2. The method of claim 1, wherein the at least one shot region comprises a plurality of shot regions, the method further comprising:

measuring, by the testing device, the first ET data corresponding to the plurality of shot regions.

3. The method of claim 2, wherein:

a number of the plurality of shot regions is nine.

4. The method of claim 1, wherein:

the first ET data includes a power supply delay time; and the EDS data includes a loading capacitance value, a turn-on current value of a transistor, and/or a resistance value.

5. The method of claim 1, further comprising:

matching the first ET data with corresponding EDS coordinates.

6. The method of claim 5, wherein:

the machine learning is performed on the relationship between the first ET data and the EDS data in consideration of a weight according to the matching coordinates and/or a gradient.

7. The method of claim 6, wherein:

the predicting of the second ET data includes predicting the second ET data using the relationship on which the machine learning is performed.

8. The method of claim 1, further comprising:

analyzing, by an ET prediction tool, the first ET data and the second ET data.

9. The method of claim 8, wherein modifying a process for manufacturing comprises:

modeling, by the ET prediction tool, a cause of a process issue based on the analyzed data.

10. An electrical test prediction apparatus comprising:

a testing device configured to perform an electrical test on each of a plurality of shot regions of a wafer, each of the plurality of shot regions including at least one semiconductor chip; and a computing device configured to determine a relationship between first shot data measured from the testing device, and electrical die sorting (EDS) data obtained by measuring a state of each semiconductor chip on the wafer, configured to perform machine learning on the relationship, and configured to predict second shot data for semiconductor chips of a region of the wafer other than the plurality of shot regions using result values obtained by performing the machine learning, and configured to modify one or more of an etching process, a flowable CVD process, and a CMP process for one or more of the at least one semiconductor chip based on the first shot data, the EDS data, and the second shot data, wherein:

each of the first shot data and the second shot data includes at least one electrical parameter of an individual device associated with operation of a semiconductor chip.

11. The electrical test prediction apparatus of claim 10, wherein:

the testing device is configured to perform an electrical test on a test element group (TEG) that corresponds to each of the plurality of shot regions.

12. The electrical test prediction apparatus of claim 10, wherein:

the computing device is configured to obtain the first shot data from the testing device, and is configured to perform the machine learning using an electrical test (ET) prediction tool to predict remaining pieces of shot data.

13. The electrical test prediction apparatus of claim 12, wherein:

the computing device is configured to model a cause of a process issue using the first shot data and the remaining pieces of shot data.

14. The electrical test prediction apparatus of claim 10, wherein:

the computing device further comprises a memory configured to store the EDS data.

15. A computing device comprising:

a processor configured to drive an electrical test (ET) prediction tool; and a memory configured to store electrical die sorting (EDS) data obtained from the ET prediction tool and a state of each of a plurality of semiconductor chips on a wafer, wherein:

the ET prediction tool is configured to sample ET data measured from the wafer using a testing device, is configured to match the sampled ET data with a same EDS coordinates, is configured to perform machine learning on the matching ET data and the EDS data, is configured to predict overall ET data based on a result obtained by performing the machine learning, and is configured to modify one or more of an etching process, a flowable CVD process, and a CMP process for at least one of the plurality of semiconductor chips based on the sampled ET data, the EDS data, and the predicted ET data; and the ET data includes at least one electrical parameter of an individual device used in operation of a semiconductor chip.

16. The computing device of claim 15, wherein:

the ET prediction tool is configured to analyze the predicted ET data, and is configured to model a cause of a process issue using the analyzed data.

17. The computing device of claim 16, wherein:

the ET prediction tool is configured to modify one or more of the etching process, the flowable CVD process, and the CMP process, according to the modeled cause of the process issue.

18. The computing device of claim 15, wherein:

the ET prediction tool is configured to modify one or more of the etching process, the flowable CVD process, and the CMP process using full-shot data, predicted by the ET prediction tool, and the EDS data.

19. The computing device of claim 15, wherein:

the EDS data includes measurement values for all chips of the wafer; and the EDS data includes values for a test element group (TEG) corresponding to each of a plurality of shot regions of the wafer.

* * * * *